US012396067B2

(12) United States Patent
Fukui et al.

(10) Patent No.: US 12,396,067 B2
(45) Date of Patent: Aug. 19, 2025

(54) THERMAL RADIATION ELEMENT, THERMAL RADIATION ELEMENT MODULE, AND THERMAL RADIATION LIGHT SOURCE

(71) Applicant: TAMRON CO., LTD., Saitama (JP)

(72) Inventors: Shunya Fukui, Saitama (JP); Jie Li, Saitama (JP)

(73) Assignee: TAMRON CO., LTD., Saitama (JP)

( * ) Notice: Subject to any disclaimer, the term of this patent is extended or adjusted under 35 U.S.C. 154(b) by 769 days.

(21) Appl. No.: 17/744,173

(22) Filed: May 13, 2022

(65) Prior Publication Data

US 2022/0418044 A1 Dec. 29, 2022

(30) Foreign Application Priority Data

Jun. 28, 2021 (JP) ................................ 2021-106816

(51) Int. Cl.
*H05B 3/00* (2006.01)
*H05B 3/26* (2006.01)

(52) U.S. Cl.
CPC ............ *H05B 3/009* (2013.01); *H05B 3/265* (2013.01); *H05B 2203/016* (2013.01); *H05B 2203/032* (2013.01)

(58) Field of Classification Search
None
See application file for complete search history.

(56) References Cited

U.S. PATENT DOCUMENTS

| | | | | |
|---|---|---|---|---|
| 10,067,270 | B2 * | 9/2018 | Nagao | H05K 9/0088 |
| 2021/0385908 | A1 * | 12/2021 | Suemitsu | H01K 1/08 |

FOREIGN PATENT DOCUMENTS

| | | | | | |
|---|---|---|---|---|---|
| CN | 112020794 | A | * | 12/2020 | H01Q 13/106 |
| JP | 2018136576 | A | * | 8/2018 | H05K 9/00 |
| JP | 2020064820 | A | * | 4/2020 | H01K 1/26 |

* cited by examiner

*Primary Examiner* — Andrew Smyth
(74) *Attorney, Agent, or Firm* — Paratus Law Group, PLLC

(57) ABSTRACT

A thermal radiation element includes a substrate; and a plasmonic perfect absorber in which a first conductor layer covering one main surface of the substrate, an insulator layer, and a second conductor layer are laminated in this order, in which the first conductor layer is provided with electrodes through which a current flows in an in-plane direction of a main surface of the first conductor layer.

13 Claims, 3 Drawing Sheets

THERMAL RADIATION ELEMENT, THERMAL RADIATION ELEMENT MODULE, AND THERMAL RADIATION LIGHT SOURCE

CROSS-REFERENCE TO RELATED APPLICATIONS

This application is based on and claims the benefit of priority from Japanese Patent Application No. 2021-106816, filed on Jun. 28, 2021, the entire contents of which are incorporated herein by reference.

BACKGROUND OF THE INVENTION

Technical Field

The present invention relates to a thermal radiation element. The present invention also relates to a thermal radiation element module and a thermal radiation light source, each of which includes the thermal radiation element.

Related Art

In recent years, ideas for obtaining optical property independent of a material by forming a microstructure on a material surface have been widely studied. Examples of the microstructure include a plasmonic structure, and a plasmonic perfect absorber has been reported as one of plasmonic structures. The plasmonic perfect absorber has a high absorptance in a specific wavelength band, among plasmonic structures. The plasmonic perfect absorber is a resonator structure in which a conductor, an insulator, and a conductor are stacked, and also referred to as a metal-insulator-metal (MIM) structure.

According to Kirchhoff's law, the emissivity is equal to the absorptance in opaque. It has also been reported that the emissivity at a material surface can be controlled using the MIM structure. The emissivity is represented by a ratio between radiation intensities of a real surface and a blackbody surface. Planck's law defines thermal radiation at the blackbody surface, and a value obtained by multiplying the thermal radiation by the emissivity is thermal radiation at the real surface. Thermal radiation is a phenomenon in which thermal energy of an object, such as a blackbody or MIM structure, is emitted as electromagnetic waves according to a temperature of the object. The term "radiation" hereinafter refers to thermal radiation unless otherwise specified.

JP 2018-136576 A can be cited as a prior art document related to emissivity control. JP 2018-136576 A discloses a technique of performing thermal radiation of narrow-band infrared rays by wavelength control of emissivity using the MIM structure.

As described in JP 2020-64820 A, a thermal radiation light source to which the emissivity control using the MIM structure is applied is already known. JP 2020-64820 A discloses a technique of suppressing oxidation of the MIM structure that may occur when the MIM structure is operated in the atmosphere by using a layer suppressing oxidation as a surface layer.

Meanwhile, as illustrated in FIG. 1B of JP 2018-136576 A and FIG. 1 of JP 2020-64820 A, the MIM structure is laminated on a substrate (which is a base in JP 2018-136576 A). Hereinafter, the substrate and the MIM structure laminated on the substrate are collectively referred to as a thermal radiation element.

For utilizing the thermal radiation using such a thermal radiation element, it is essential to heat the MIM structure to a predetermined operating temperature. The higher the operating temperature is, the higher the intensity of the thermal radiation is, while the radiation on a shorter wavelength is emitted. The temperature is a balance of thermal energy. The temperature increases as an input amount increases with respect to a loss amount of thermal energy. When the same materials have the same energy, an amount of rise in temperature depending on a volume. Thermal energy required to raise the temperature of an object by 1° C. is defined as in the following Equation (1), wherein heat capacity is denoted by C [J/° C.], specific heat is denoted by c [J/kg·° C.], density is denoted by ρ [kg/m$^3$], and volume is denoted by V [m$^3$]:

$$C=c\times\rho\times V \quad (1)$$

JP 2020-64820 A stated above describes, as a method of heating the MIM structure in the thermal radiation light source, a method of self-heating a substrate by energizing the substrate and a method of externally heating the substrate and the MIM structure using an external heating unit (for example, a heater). In any of these methods, a heat transfer path passes through the substrate when heating the MIM structure. As described above, when viewed from the MIM structure, the substrate functions as a heat source. Therefore, in order to cause the temperature of the MIM structure to reach the operating temperature described above, it is necessary to keep the temperature of the substrate, which is a heat source, equal to or higher than the operating temperature.

Since the substrate is thicker than the MIM structure, the volume inevitably increases. In other words, the heat capacity C of the substrate must be larger than the heat capacity C of the MIM structure. Therefore, the conventional method of heating the entire MIM structure using the substrate as a heat source (for example, the method described in JP 2020-64820 A) can be further improved in terms of energy efficiency.

One aspect of the present invention has been made to solve the problems stated above, which is intended to enhance energy efficiency as compared with in the thermal radiation element of JP 2020-64820 A which is the conventional invention. Another aspect of the present invention is intended to provide a thermal radiation element module and a thermal radiation light source, each of which includes the thermal radiation element having higher energy efficiency than conventional elements.

SUMMARY OF THE INVENTION

In order to implement the aspect of the present invention, a thermal radiation element according to one aspect of the present invention includes: a substrate made of an insulator having a pair of main surfaces; and a plasmonic perfect absorber in which a first conductor layer covering at least a part of one main surface of the substrate, an insulator layer, and a second conductor layer are laminated in this order. The thermal radiation element adopts a configuration in which the first conductor layer is provided with electrodes through which a current flows in an in-plane direction of a main surface of the first conductor layer.

In order to implement the aspect of the present invention, a thermal radiation element module according to one aspect of the present invention includes the thermal radiation element according to one aspect of the present invention; and a housing provided with a cavity that houses the thermal radiation element and a power terminal that supplies power to the electrode. In the thermal radiation element module, at least a part of the substrate is fixed to the cavity using a bonding member inside the cavity.

In order to implement the aspect of the present invention, a thermal radiation light source according to one aspect of the present invention includes the thermal radiation element module according to one aspect of the present invention.

According to one aspect of the present invention, it is possible to enhance energy efficiency as compared with the thermal radiation element of JP 2020-64820 A which is the conventional invention. According to another aspect of the present invention, it is possible to provide a thermal radiation element module and a thermal radiation light source, each of which includes the thermal radiation element having higher energy efficiency than conventional elements.

DESCRIPTION OF THE EMBODIMENTS

Figure 1:
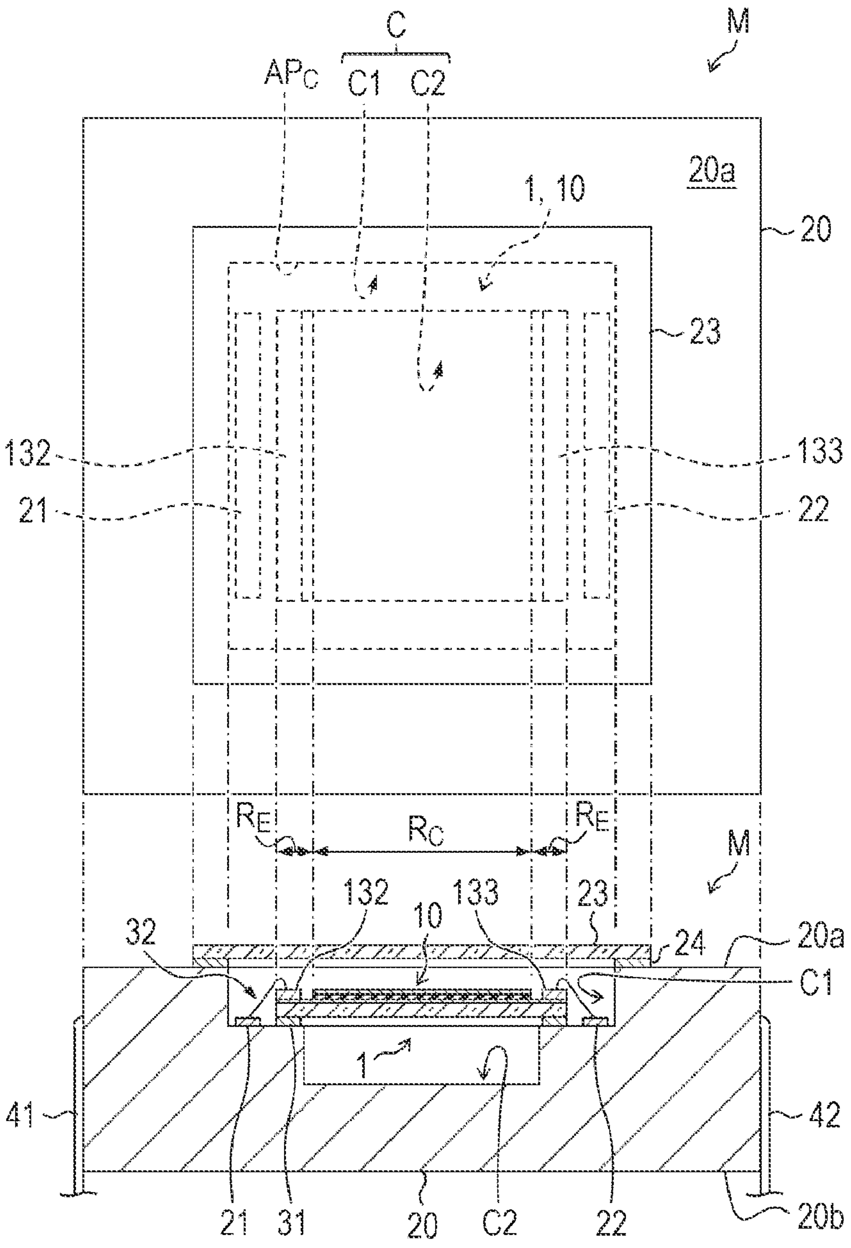
FIG. 1 includes an upper view that is a plan view of a thermal radiation element module according to one embodiment of the present invention, and a lower view that is a cross-sectional view of the same thermal radiation element module.
Figure 2:
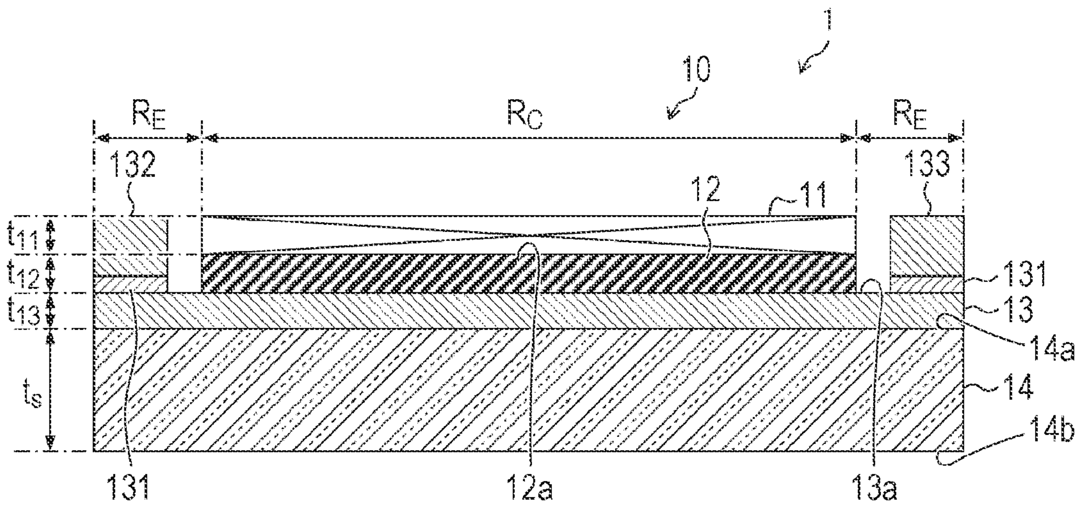
FIG. 2 is a cross-sectional view of a thermal radiation element included in the thermal radiation element module illustrated in FIG. 1.
Figure 3:
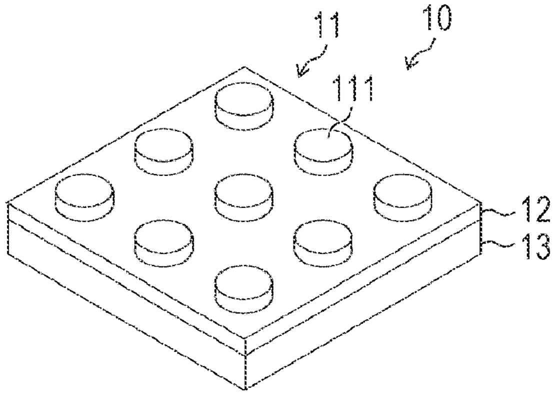
FIG. 3 is an enlarged perspective view in which a part of a plasmonic perfect absorber included in the thermal radiation element illustrated in FIG. 2 is enlarged.

A thermal radiation element module M according to one embodiment of the present invention will be described with reference to FIGS. 1 to 3. FIG. 1 includes an upper view that is a plan view of the thermal radiation element module M, and a lower view that is a cross-sectional view of the thermal radiation element module M. The plan view of the thermal radiation element module M is obtained when an opening $AP_c$ of a cavity C provided in a housing 20 is viewed in plan view from a normal direction of a main surface of an optical window 23. The cross-sectional view of the thermal radiation element module M is obtained in a cross section along the normal direction of a main surface of the optical window 23 and including a thermal radiation element 1. FIG. 2 is a cross-sectional view of the thermal radiation element 1, and is an enlarged view of a part of the thermal radiation element 1 shown in FIG. 1. In FIG. 2, each component is enlarged in a thickness direction. FIG. 3 is an enlarged perspective view in which a part of a plasmonic perfect absorber 10 included in the thermal radiation element 1 is enlarged.

[Configuration of Thermal Radiation Element Module]

As illustrated in the upper and lower views of FIG. 1, the thermal radiation element module M includes a plasmonic perfect absorber 10, a substrate 14, a housing 20, an optical window 23, a bonding member 24, a bonding member 31, a metal wire 32, and power terminals 41 and 42.

In a configuration of the thermal radiation element module M, the substrate 14 and the plasmonic perfect absorber 10 constitute the thermal radiation element 1 according to the aspect of the present invention.

Additionally, the thermal radiation element module M emits electromagnetic waves (in particular, at least one of visible light, near-infrared light, mid-infrared light, and far-infrared light) caused by thermal radiation by energizing a conductor layer 13 constituting a part of the plasmonic perfect absorber 10 using the power terminals 41 and 42. As described above, the thermal radiation element module M functions as a thermal radiation light source that emits electromagnetic waves of at least one of visible light, near-infrared light, mid-infrared light, and far-infrared light. That is, the thermal radiation light source using the thermal radiation element module M is also included in the scope of the present invention. The thermal radiation light source may include the thermal radiation element module M and a power supply module that supplies power to the thermal radiation element module M via the power terminals 41 and 42.

The thermal radiation element module M is configured to cause a current to flow in an in-plane direction of the conductor layer 13 using the power terminals 41 and 42. The current flowing in the in-plane direction of the conductor layer 13 generates Joule heat. Therefore, the electromagnetic waves stated above are emitted by heating the thermal radiation element 1 to a predetermined operating temperature using thermal energy in the thermal radiation element module M. The operating temperature of the thermal radiation element 1 can be appropriately determined to be within a temperature range in which eutectic reaction does not occur in the plasmonic perfect absorber 10. The higher the operating temperature is, the higher intensity the light emitted by the plasmonic perfect absorber 10 has. In the thermal radiation element 1 described in the present embodiment, the operating temperature is assumed to be 300° C. or more and 1200° C. or less.

<Substrate>

The substrate 14 is a plate-like member made of an insulator having a pair of main surfaces **14*a* and 14*b*. In a state illustrated in FIG. 2, the main surface 14*a* is located on an upper side, and the main surface 14*b* is located on a lower side. A shape of the substrate 14 can be appropriately tailored, but is preferably a rectangular shape or a square shape. In the present embodiment, the substrate 14** has a square shape.

In the present embodiment, quartz glass, which is one example of glass, is adopted as a material constituting the substrate 14. However, a glass constituting the substrate 14 is not limited to quartz glass. The glass constituting the substrate 14 preferably contains $SiO_2$ as a main substance. In the present embodiment, the main substance means a substance accounting for the largest content.

In addition, the material constituting the substrate 14 may be oxide or nitride ceramic. Examples of such a ceramic include a ceramic containing silicon oxide ($SiO_2$) as a main substance, a ceramic made of silicon nitride ($Si_3N_4$), a ceramic made of zircon oxide ($ZrO_2$), and a ceramic composed of a mixture of calcium silicate and lithium aluminosilicate. The ceramic composed of a mixture of calcium silicate and lithium aluminosilicate is also referred to as ADCERAM (registered trademark).

The material constituting the substrate 14 can be appropriately selected from the materials stated above in terms of a melting point, thermal conductivity, cost, and the like. In order to suppress the eutectic reaction that can occur at a high operating temperature, the high melting point is preferred. In order to increase energy efficiency when the plasmonic perfect absorber 10 (described later) is heated using Joule heat generated in the conductor layer 13 of the plasmonic perfect absorber 10, the thermal conductivity of the substrate 14 is preferably lower than the conductivity of the conductor constituting the conductor layer 13 (described later). In order to suppress the manufacturing cost of the thermal radiation element 1, it is preferable that the substrate 14 has a low cost.

A thickness $t_s$ (see FIG. 2) of the substrate 14 is preferably 100 μm or more and 10 mm or less.

For convenience of description, the substrate 14 is hereinafter divided into three strip-shaped regions, each of which is parallel. A central region $R_c$ is a main region including the center of the substrate 14, and is a region having the widest width (length in a left-right direction in FIGS. 1 and 2) among the three regions. A pair of edge regions $R_E$ is two regions sandwiching the central region $R_c$. In the present embodiment, outlines (shapes in plan view) of the central region $R_C$ and the pair of edge regions $R_E$ have all rectangular shapes. However, the outlines of the central region $R_C$ and the pair of edge regions $R_E$ are not limited thereto, and can be determined as appropriate.

<Plasmonic Perfect Absorber>

As illustrated in FIG. 3, the plasmonic perfect absorber 10 included in the thermal radiation element 1 includes a conductor layer 11, an insulator layer 12, and a conductor layer 13. The conductor layer 11 is one example of the second conductor layer, and the conductor layer 13 is one example of the first conductor layer. On the main surface 14*a* of the substrate 14, the conductor layer 13, the insulator layer 12, and the conductor layer 11 are laminated in this order.

(First Conductor Film)

The conductor layer 13 is a film made of a conductor formed on the main surface 14*a* which is one main surface (upper main surface in FIG. 2) of the substrate 14 so as to cover the main surface 14*a*. That is, the conductor layer 13 is formed over the central region $R_c$ and the pair of edge regions $R_E$.

In the present embodiment, hafnium nitride (HfN) is adopted as the conductor constituting the conductor layer 13. However, the conductor constituting the conductor layer 13 is not limited to HfN, and may be any material as long as it has metallic conductive characteristics. When the plasmonic perfect absorber 10 is formed on a surface of the base material which is assumed to have a high temperature at the time of use, the material constituting the conductor layer 13 is preferably a material having a high melting point such as HfN. The melting point of HfN is typically 3330° C.

A region of the main surface 14*a* where the conductor layer 13 is formed may be the entire main surface 14*a* or a part of the surface of the base material, and can be appropriately determined. In the present embodiment, the conductor layer 13 is formed on the entire main surface 14*a*.

In the present embodiment, a thickness $t_{13}$ (see FIG. 2) of the conductor layer 13 is set to 100 nm. However, the thickness $t_{13}$ is not limited to 100 nm, and can be appropriately determined within a range of, for example, 10 nm to 10 μm. The thickness $t_{13}$ is one example of the thickness $t_1$ recited in the claims.

(Insulator Film)

The insulator layer 12 is a film made of an insulator formed on a main surface 13*a* (upper main surface in FIG. 2) which is a main surface opposite to the substrate 14 among main surfaces of the conductor layer 13, so as to cover at least a part of the main surface 13*a*. In the present embodiment, as illustrated in FIG. 2, the insulator layer 12 is laminated on the conductor layer 13 so as to cover the central region $R_c$. In the present embodiment, since the central region $R_c$ has a rectangular outline, the conductor layer 13 has also a rectangular outline.

In the present embodiment, the insulator layer 12 which is a solid film having a uniform thickness is formed so as to cover the entire central region $R_c$. However, the insulator layer 12 may be formed only in a region encompassed in the central region $R_c$, where a plurality of conductor patterns 111 is formed. Similarly, to the conductor layer 11, the insulator layer 12 may be composed of the plurality of conductor patterns arranged periodically, each of the plurality of insulator patterns has a circular shape or a regular polygonal shape.

In the present embodiment, $SiO_2$ is adopted as the material constituting the insulator layer 12. However, the material constituting the insulator layer 12 may be any insulator, and is not limited to $SiO_2$. Examples of such a material include insulating oxides. In a case where the plasmonic perfect absorber 10 is formed on the main surface 14*a* of the substrate 14 that is assumed to have a high temperature during use, the material constituting the insulator layer 12 is preferably any of $SiO_2$, aluminum oxide ($Al_2O_3$), aluminum nitride (AlN), and a mixture of $SiO_2$ and $Al_2O_3$.

In the present embodiment, a thickness $t_{12}$ (see FIG. 2) of the insulator layer 12 is set to 180 nm. However, the thickness $t_{12}$ is not limited to 180 nm, and can be appropriately determined within a range of, for example, 10 nm to 10 μm.

(Second Conductor Layer)

The conductor layer 11 is formed on a main surface 12*a* (upper main surface in FIG. 2) which is a main surface opposite to the insulator layer 12 among main surfaces of the insulator layer 12. Similarly to the insulator layer 12, the conductor layer 11 is laminated only in the central region $R_c$. Therefore, the insulator layer 12 and the conductor layer 11 are laminated in only the central region $R_c$ in the plasmonic perfect absorber 10.

The conductor layer 11 includes the plurality of (nine in FIG. 3) conductor patterns 111 each having a circular shape. However, the shape of each conductor pattern 111 is not limited to the circular shape, and may be a regular polygonal shape. Preferable examples of the regular polygonal shape include a regular hexagonal shape.

A reference numeral 111 is given to only one conductor pattern 111 among the plurality of conductor patterns 111. As illustrated in FIG. 3, the plurality of conductor patterns 111 is two-dimensionally and periodically arranged on the main surface 12*a*. In the present embodiment, as illustrated in FIG. 3, a square arrangement is adopted as the periodic two-dimensional arrangement of the conductor patterns 111. However, the periodic two-dimensional arrangement is not limited to the square arrangement, and may be, for example, a six-way arrangement.

In the cross-sectional view illustrated in FIG. 2, the plurality of conductor patterns 111 constituting the conductor layer 11 are not shown. In practice, a periodic two-dimensional structure including the plurality of conductor patterns 111 is formed on the entire main surface 12*a*.

In the present embodiment, hafnium nitride (HfN) is adopted as the conductor constituting each conductor pattern 111 of the conductor layer 11. However, the conductor constituting each conductor pattern 111 is not limited to HfN, and may be any material as long as it has metallic conductive characteristics. The conductor constituting each conductor pattern 111 is the same as the conductor constituting the conductor layer 13.

In the present embodiment, a thickness $t_{11}$ of the conductor layer 11 (see FIG. 2; i.e. a thickness of each conductor pattern 111) is set to 100 nm. However, the thickness $t_{13}$ is not limited to 40 nm, and can be appropriately determined within a range of, for example, 10 nm to 10 μm. The thickness $t_{11}$ is one example of the thickness $t_2$ recited in the claims.

The thickness $t_{13}$ of the conductor layer 13 and the thickness $t_{11}$ of the insulator layer 12 preferably satisfy a relationship of $t_{13}>1.5\times t_{11}$.

(Pair of Electrode Pads)

As illustrated in FIGS. 1 and 2, a base layer 131 and an electrode pad 132 are laminated in this order on the conductor layer 13 in one edge region $R_E$ (a left side in the state illustrated in FIG. 2). A base layer 131 and an electrode pad 133 are laminated in this order on the conductor layer 13 in the other edge region $R_E$ (a right side in the state illustrated in FIG. 2).

The pair of base layers 131 and the pair of electrode pads 132 and 133 are provided in a band shape along the edge region $R_E$. The pair of base layers 131 and the pair of electrode pads 132 and 133 are one example of the pair of electrodes recited in the claims.

By connecting wirings having different polarities and supplying power to each of the electrode pads 132 and 133, a current flows from one of the electrode pads 132 and 133 to the other. That is, the current flows through the conductor layer 13 in the in-plane direction of the main surface 13*a*. Therefore, the pair of base layers 131 and the electrode pads 132 and 133 provided on the main surface 13*a* of the conductor layer 13 are one example of the electrodes that cause the current to flow in the in-plane direction of the main surface of the conductor layer 13.

In the present embodiment, the pair of base layers 131, elongated in a band shape, and the each of the electrode pads 132 and 133 are provided so as to sandwich the central region $R_c$. That is, the pair of base layers 131 and each of the electrode pads 132 and 133 are provided along each of the pair of opposite sides in the central region $R_c$ having the rectangular shape (square shape in the present embodiment).

In the present embodiment, gold is adopted as a material constituting the electrode pads 132 and 133. However, the material is not limited to gold, and can be appropriately determined in consideration of a high conductivity, a low reactivity, a high melting point, and the like.

In the present embodiment, a two-layer film of Cr/Pt in which chromium (Cr) and platinum (Pt) are laminated in this order is used as the pair of base layers 131. The thicknesses of Cr and Pt are not particularly limited, but are each 50 nm in the present embodiment. However, the pair of base layers 131 may have a configuration as a single layer film or a multilayer film made of three or more layers. The material of each film constituting the pair of base layers 131 can also be appropriately selected. The pair of base layers 131 can be omitted in some cases in terms of compatibility and reactivity with the material constituting the substrate 14 and the material constituting the electrode pads 132 and 133.

<Housing>

The housing 20 is a rectangular parallelepiped block. In the present embodiment, a material constituting the housing 20 is aluminum, which is one example of metal. However, the metal constituting the housing 20 is not limited to aluminum, and can be appropriately selected. The material constituting the housing 20 is not limited to metal, and may be an alloy, an inorganic compound such as ceramic, or an organic compound such as resin. However, in a case where the operating temperature of the thermal radiation element 1 is set to 150° C. or higher, the material constituting the housing 20 is preferably any of metal, alloy, and ceramic.

Out of a pair of main surfaces of the housing 20, the main surface located on an upper side in the state illustrated in FIG. 1 is referred to as a main surface 20*a*, and the main surface located on a lower side in the state illustrated in FIG. 1 is referred to as a main surface 20*b*. The cavity C is formed in the main surface 20*a*. A depth of the cavity C is smaller than a thickness of the housing 20. Therefore, the cavity C does not penetrate the main surface 20*b*.

The cavity C includes two subcavities C1 and C2.

The subcavity C1 is formed in a region close to the main surface 20*a* (that is, a shallow region). The subcavity C2 is formed in a region farther away from the main surface 20*a* as compared to the subcavity C1 (that is, a deep region). An opening $AP_c$ of the subcavity C1 is determined to have a size that is able to accommodate the thermal radiation element 1 in plan view. A reference sign $AP_c$ is clearly illustrated in the upper view of FIG. 1, but $AP_c$ is omitted in the lower view of FIG. 1.

On the other hand, an opening of the subcavity C2 formed on a bottom surface of the subcavity C1 is determined to have a size that can be included by the thermal radiation element 1 in plan view. The cavity C thus configured is formed in a stepped shape.

The thermal radiation element 1 is accommodated in the subcavity C1 of the cavity C. At least a part of the edge region $R_E$ of the substrate 14 constituting the thermal radiation element 1 is fixed to a bottom wall of the subcavity C1 using the bonding member 31. In the present embodiment, sintered silver (Ag) is adopted as the bonding member 31. The silver thus sintered has heat resistance to withstand the operating temperature of the thermal radiation element 1 (for example, any temperature falling within a range from 300° C. to 1200° C.), and is thus preferable as the bonding member 31.

As described above, since the thermal radiation element 1 has a high operating temperature, in order to enhance energy efficiency, it is preferable to suppress thermal energy dissipated by heat conduction from the thermal radiation element 1 to the housing 20. In the thermal radiation element module M, since the subcavity C2 is formed in the housing 20 in addition to the subcavity C1, it is possible to limit a path of heat conduction that can occur between the thermal radiation element 1 and the housing 20.

Electrode pads 21 and 22 are provided on the bottom wall of the subcavity C1 so as to run in parallel with the electrode pads 132 and 133. The electrode pad 21 and the electrode pad 132 are electrically connected by the metal wire 32 (see the lower view of FIG. 1). Similarly, the electrode pad 22 and the electrode pad 133 are electrically connected by the metal wire (reference numeral is omitted) (see the lower view of FIG. 1).

In the present embodiment, the electrode pads 21 and 22 are also extended in a band shape similarly to the electrode pads 132 and 133. Since the electrode pads 21 and 22 and the electrode pads 132 and 133 are both extended in a band shape, a plurality of metal wires 32 can be used to conduct the electrodes. Therefore, it is possible to reduce a resistance value that can be generated between the electrode pad 21 and the electrode pad 132 and between the electrode pad 22 and the electrode pad 133, and it is possible to ensure redundancy in a case where the electrode pads are electrically connected to each other.

As illustrated in the lower view of FIG. 1, the housing 20 is provided with the power terminals 41 and 42. The power terminal 41 is drawn from the outside to the inside of the housing 20. A tip of the power terminal 41 is electrically connected to the electrode pad 21. Similarly, the power terminal 42 is drawn from the outside to the inside of the housing 20. A tip of the power terminal 42 is electrically connected to the electrode pad 22. A portion where each of the power terminals 41 and 42 is drawn to the inside of the housing 20 is sealed so as to maintain hermeticity.

As illustrated in the upper view and the lower view of FIG. 1, the opening $AP_c$ is covered with the optical window 23. A material constituting the optical window 23 preferably has translucency and heat resistance to withstand the operating temperature of the thermal radiation element 1 (for example, any temperature falling within a range from 300° C. to 1200° C.). In the present embodiment, a plate-shaped member made of quartz glass is adopted.

The optical window 23 is joined to the main surface 20*a* of the housing 20 using the bonding member 24. In the present embodiment, gold (Au)-tin (Sn) solder is used as the bonding member 24.

The thermal radiation element module M is configured such that a pressure inside the cavity C is lower than a pressure (for example, atmospheric pressure) outside the cavity C. This configuration can be implemented, for example, by sealing the cavity C under a reduced pressure environment in which the pressure is lower than the atmospheric pressure. The pressure inside the cavity C is preferably, but not limited to, $1\times10^3$ Pa or less. As the pressure inside the cavity C is lower, the adiabaticity of the cavity C can be enhanced.

SUMMARY

The thermal radiation element 1 according to one aspect of the present invention includes: the substrate 14 made of an insulator; and the plasmonic perfect absorber 10 in which the conductor layer 13 (first conductor layer) covering at least a part of one main surface 14*a* (entire in the present embodiment), the insulator layer 12, and the conductor layer 11 (second conductor layer) are laminated in this order. In the plasmonic perfect absorber 10, the conductor layer 13 is provided with the base layer 131 and the electrode pads 132 and 133 which are electrodes through which the current flows in the in-plane direction of the main surface 13*a*.

According to this configuration, the conductor layer 13 is used as a heat source when viewed from the plasmonic perfect absorber 10. That is, the substrate 14 having a larger volume than that of the plasmonic perfect absorber 10 when viewed from the plasmonic perfect absorber 10 is not a heat source. Therefore, in a case where the plasmonic perfect absorber 10 is heated to the operating temperature, it is not necessary to heat the substrate 14 having a large volume to the operating temperature or higher, whereby the thermal radiation element 1 can enhance energy efficiency as compared with the thermal radiation element of JP 2020-64820 A which is a conventional invention.

The thermal radiation element 1 adopts a configuration in which the thermal conductivity of the insulator constituting the substrate 14 is lower than the thermal conductivity of the conductor constituting the conductor layer 13.

According to this configuration, the thermal energy generated by the conductor layer 13 as a heat source can be suppressed from escaping to the substrate 14, whereby the energy efficiency can be further enhanced.

The thermal radiation element 1 adopts a configuration in which the conductor layer 11 includes the plurality of conductor patterns 111 arranged two-dimensionally and periodically, each of the plurality of conductor patterns 111 having a circular shape or a regular polygonal shape.

According to this configuration, the wavelength range of the light emitted from the plasmonic perfect absorber 10 can be adjusted by adjusting the size and the periodic arrangement of the plurality of conductor patterns 111.

The thermal radiation element 1 adopts a configuration in which the thickness $t_{13}$ of the conductor layer 13 (thickness t1 of the first conductor layer) and the thickness $t_{11}$ of the conductor layer 11 (thickness t2 of the second conductor layer) satisfy the relationship of $t_{13}>1.5\times t_{11}$ ($t1>1.5\times t2$).

According to this configuration, since the resistance value of the conductor layer 13 is appropriately lowered, a large current easily flows through the conductor layer 13. Therefore, the thermal energy generated in the conductor layer 13 can be increased.

The thermal radiation element 1 adopts a configuration in which the thickness $t_S$ of the substrate 14 is 100 μm or more and 10 mm or less.

According to this configuration, the strength of the substrate 14 supporting the plasmonic perfect absorber 10 can be increased to a practically sufficient strength. In this way, for allowing the substrate 14 to have sufficient strength, the thickness $t_S$ is significantly thicker than the total thickness of the plasmonic perfect absorber 10. Therefore, the thermal radiation element 1 can enhance the energy efficiency more reliably than the conventional thermal radiation element.

The thermal radiation element 1 adopts a configuration in which the thickness $t_{13}$ (thickness t1 of the first conductor layer), the thickness $t_{12}$ of the insulator layer 12 (thickness td of the insulator layer), and the thickness $t_{11}$ (thickness t2 of the second conductor layer) are all 10 nm or more and 10 μm or less.

According to this configuration, it is possible to prevent the total thickness of the plasmonic perfect absorber 10 from becoming unintentionally thick and to prevent the total thickness of the plasmonic perfect absorber 10 from becoming thicker than the thickness $t_S$. Therefore, the thermal radiation element 1 can enhance the energy efficiency more reliably than the conventional thermal radiation element.

Further, the thermal radiation element 1 adopts a configuration in which a region (central region $R_c$) where the conductor layer 13 (first conductor layer) is formed has a rectangular shape (i.e. square shape in the present embodiment), and the electrode includes the pair of base layers 131 and the pair of electrode pads 132 and 133, corresponding to the pair of electrodes. The thermal radiation element 1 adopts a configuration in which each of the pair of electrodes is provided on each of the pair of opposite sides in a region having the rectangular shape (central region $R_c$).

According to this configuration, uniform current distribution of the current flowing in the in-plane direction of the main surface 13*a* of the conductor layer 13 can be established. Since the uniform distribution of Joule heat generated in the conductor layer 13 can be established, the temperature distribution on the main surface 13*a* can be made uniform approximately.

The thermal radiation element 1 adopts a configuration in which the substrate 14 is composed of glass or ceramic.

According to this configuration, since the thermal conductivity of the insulator constituting the substrate 14 can be reliably made lower than the thermal conductivity of the conductor constituting the conductor layer 13, the thermal energy generated by the conductor layer 13 can be reliably suppressed from escaping to the substrate 14. Therefore, the energy efficiency can be reliably enhanced.

The thermal radiation element 1 adopts a configuration in which the conductor layer 13 (first conductor layer) and the conductor layer 11 (second conductor layer) are made of hafnium nitride (HfN).

According to this configuration, since HfN has a high melting point, it is possible to suppress the eutectic reaction that can occur with at least one of the insulator constituting the substrate 14 and the insulator constituting the insulator layer 12. Therefore, the operating temperature of the thermal radiation element 1 can be increased.

The thermal radiation element 1 adopts a configuration in which the insulator layer 12 is made of at least one of $SiO_2$, $Al_2O_3$, and AlN.

According to this configuration, the insulator layer 12 having high insulating properties can be easily formed.

The thermal radiation element module M according to one aspect of the present invention includes the thermal radiation element 1; and the housing 20 provided with the cavity C that houses the thermal radiation element 1 and the power terminals 41 and 42 that supply power to the pair of base layers 131 and the pair of electrode pads 132 and 133, corresponding to the electrodes. In the thermal radiation element module M, at least a part of the substrate 14 is fixed to the cavity C using the bonding member 31 inside the cavity C.

The thermal radiation element module M has the same advantageous effect as that of the thermal radiation element 1. The thermal radiation element constituting the thermal radiation element module M is not limited to the thermal radiation element 1, and may be a thermal radiation element 1A illustrated in FIG. 4 or a thermal radiation element 1B illustrated in FIG. 5. The thermal radiation elements 1A and 1B will be described later.

Thermal radiation element module M adopts a configuration in which the opening $AP_c$ of the cavity C includes the thermal radiation element 1 in plan view of the opening $AP_c$ (see the upper view of FIG. 1), the opening $AP_c$ is sealed by the optical window 23 having translucency, and the pressure inside the cavity C is lower than the pressure outside the cavity C.

According to this configuration, since the adiabaticity of the cavity C can be enhanced as compared with a case where the pressure inside the cavity C is equal to or higher than the pressure outside the cavity C, the thermal energy generated by the conductor layer 13 can be reduced from being dissipated to the outside of the cavity C. Therefore, the energy efficiency of the entire thermal radiation element module M can also be enhanced.

Additionally, the thermal radiation element module M emits electromagnetic waves (in particular, at least one of visible light, near-infrared light, mid-infrared light, and far-infrared light) caused by thermal radiation by heating the thermal radiation element 1 to the predetermined operating temperature using the thermal energy. As described above, the thermal radiation element module M functions as a thermal radiation light source that emits electromagnetic waves of at least one of visible light, near-infrared light, mid-infrared light, and far-infrared light. That is, the thermal radiation light source including the thermal radiation element module M is also included in the scope of the present invention.

The advantageous effect achieved by one aspect of the present invention has been described using the thermal radiation element 1 illustrated in FIGS. 1 and 2. The advantageous effect of the thermal radiation element 1 described above can be similarly obtained in the thermal radiation elements 1A and 1B described later.

Modified Example 1

Figure 4:
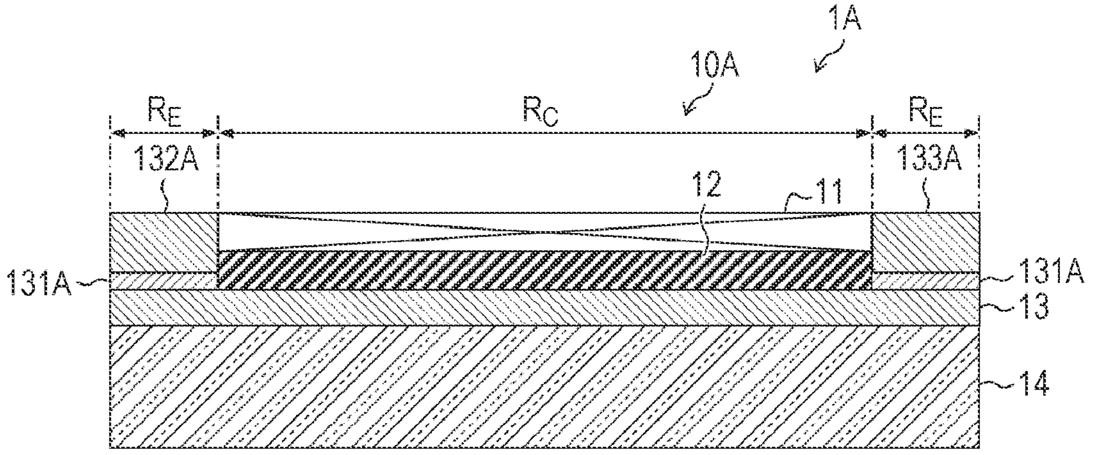
FIG. 4 is a cross-sectional view of Modified Example 1 of the thermal radiation element illustrated in FIG. 2.

The thermal radiation element 1A as Modified Example 1 of the thermal radiation element 1 will be described with reference to FIG. 4. FIG. 4 is a cross-sectional view of the thermal radiation element 1 corresponding to FIG. 2, and is a cross-sectional view of the thermal radiation element 1A.

The thermal radiation element 1A is obtained by replacing the pair of base layers 131 and the electrode pads 132 and 133 included in the thermal radiation element 1 with a pair of base layers 131A and electrode pads 132A and 133A. Therefore, in the present modified example, the pair of base layers 131A and the electrode pads 132A and 133A will be described.

In the thermal radiation element 1, the electrode pads 132 and 133 have a width (length in the left-right direction in FIG. 2) narrower than a width of the annular edge region $R_E$. Therefore, as illustrated in FIG. 2, the electrode pads 132 and 133 are formed so as to cover a part of the edge region $R_E$ in one cross section of the thermal radiation element 1.

Meanwhile, in the thermal radiation element 1A, the pair of base layers 131A and the electrode pads 132A and 133A have a width (length in the left-right direction in FIG. 4) equivalent to the width of the annular edge region $R_E$. Therefore, as illustrated in FIG. 4, the pair of base layers 131A and the electrode pads 132A and 133A are formed so as to cover the entire edge region $R_E$ in one cross section of the thermal radiation element 1A.

As is apparent from the electrode pads 132 and 133 and the electrode pads 132A and 133A, the width of the pair of electrode pads for causing the current to flow through the conductor layer 13 can be appropriately determined, and may be electrically connected to a part of the conductor layer 11 in addition to the conductor layer 13. The same applies to the pair of base layers 131A. In the thermal radiation element 1A, a part of the vicinity of upper ends of the electrode pads 132A and 133A may overlap an outer edge portion of the conductor layer 11.

Modified Example 2

Figure 5:
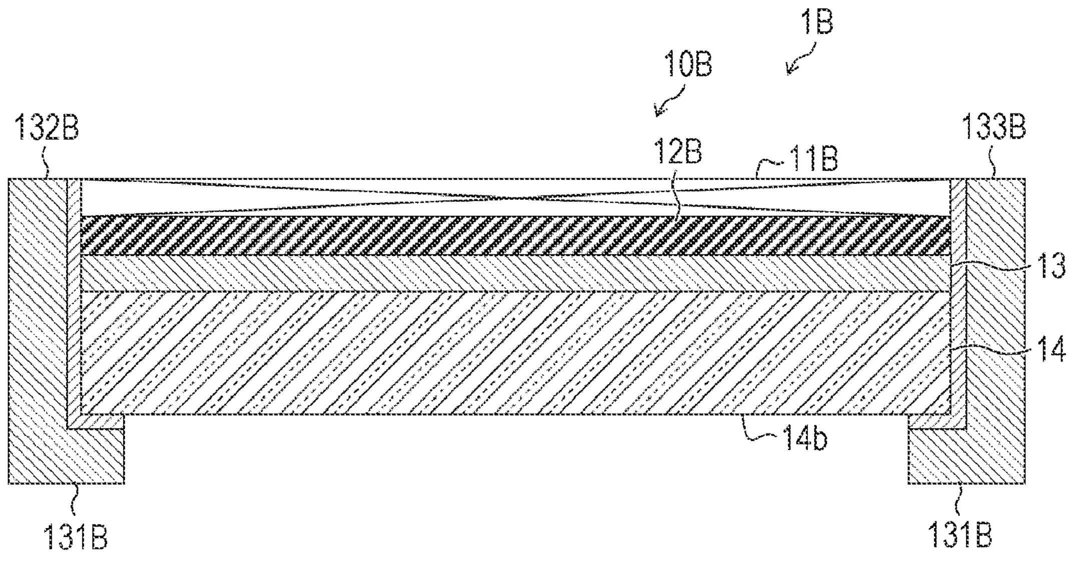
FIG. 5 is a cross-sectional view of Modified Example 2 of the thermal radiation element illustrated in FIG. 2.

The thermal radiation element 1B as Modified Example 2 of the thermal radiation element 1 will be described with reference to FIG. 5. FIG. 5 is a cross-sectional view of the thermal radiation element 1 corresponding to FIG. 2, and is a cross-sectional view of the thermal radiation element 1B.

The thermal radiation element 1B is obtained by replacing the insulator layer 12, the conductor layer 11, the pair of base layers 131, and the electrode pads 132 and 133 included in the thermal radiation element 1 with an insulator layer 12B, a conductor layer 11B, a pair of base layers 131B, and electrode pads 132B and 133B, respectively. Therefore, in the present modified example, the insulator layer 12B, the conductor layer 11B, the pair of base layers 131B, and the electrode pads 132B and 133B will be described.

In the thermal radiation element 1, the insulator layer 12 and the conductor layer 11 are formed so as to cover the central region $R_c$ of the main surface 13*a* of the conductor layer 13.

Meanwhile, in the thermal radiation element 1B, the insulator layer 12B and the conductor layer 11B are formed so as to cover the entire main surface 13*a* of the conductor layer 13.

In addition, as illustrated in FIG. 5, the pair of base layer 131B and the electrode pads 132B and 133B are formed so as to cover side surfaces of the substrate 14, the conductor layer 13, the insulator layer 12B, and the conductor layer

11B (that is, side surfaces of the thermal radiation element 1B) in one cross section of the thermal radiation element 1B. One base layer 131B and the electrode pad 132B are laminated in this order on one side surface (side surface on the left side in FIG. 5) of the thermal radiation element 1B, and the other base layer 131B and the electrode pad 1338 are laminated in this order on a side surface (side surface on the right side in FIG. 5) facing the side surface stated above.

In the thermal radiation element 1B, a part in the vicinity of lower ends of the pair of base layers 131B and the electrode pads 132B and 133B is also formed in a region in the vicinity of an edge of the main surface 14*b* which is a lower main surface of the substrate 14. In the thermal radiation element 1B, the pair of base layers 131B and the electrode pads 132B and 133B formed in a region in the vicinity of the edge of the main surface 14*b* are joined to the electrode pads 21 and 22 using the bonding member 31 (see the lower view of FIG. 1). As described above, in the present modified example, the bonding member 31 fixes the thermal radiation element 1B to a bottom wall of the subcavity C1 inside the cavity C, and ensures conduction between the electrode pads 132B and 133B and the electrode pads 21 and 22.

Similarly to the pair of base layers 131 and the pair of base layers 131A, the pair of base layers 131B may be a single layer film, a two-layer film, or a multilayer film made of at least three layers. Each film constituting the pair of base layers 131B can be configured in the same manner as each film constituting the pair of base layers 131 and the pair of base layers 131A.

EXAMPLES

First Example

The thermal radiation element module M according to a first example of the present invention will be described below. In the present example, the configuration of the thermal radiation element 1A illustrated in FIG. 4 is adopted as the thermal radiation element, and each component is designed as follows. In the thermal radiation element module M of this example, it has been confirmed that, in a case where 500° C. is adopted as one example of the operating temperature of the thermal radiation element 1A, near-infrared light of 1.0 μm or more and 2.0 μm or less is stably emitted. That is, the thermal radiation element module M of this example can be suitably used as a thermal radiation light source that stably emits near-infrared light of 1.0 μm or more and 2.0 μm or less when 500° C. is adopted as the operating temperature.

<Substrate>

As the substrate 14, a plate-shaped member made of quartz glass, having the thickness $t_S$ of 500 μm and the square shape with a side length of 5 mm is used.

<Plasmonic Perfect Absorber>

An HfN film having the thickness $t_{13}$ of 100 nm is used as the conductor layer 13.

As the insulator layer 12, an $SiO_2$ film having the thickness $t_{12}$ of 180 nm is used.

An HfN film having the thickness $t_{11}$ of 40 nm is used as the conductor layer 11. In addition, as shapes of the plurality of conductor patterns 111 constituting the conductor layer 11, a circular shape having a diameter of 400 nm is adopted. As the periodic arrangement of the plurality of conductor patterns 111, a square arrangement having a period of 650 nm is adopted.

As the pair of base layers 131A, a two-layer film of Cr/Pt is used. The thickness of each of Cr and Pt is 50 nm.

As the electrode pads 132A and 133A, a band-shaped gold film having a thickness of 400 nm, a width (length in the left-right direction in FIG. 4) of 200 μm, and a length (length in the depth direction in FIG. 4) of 5 mm is adopted.

The electrical resistivity of HfN adopted in this example is about $1\times10^{3}$ (Ω·mm), and the electrical resistivity of $SiO_2$ adopted in this example is about $1\times10^{5}$ (Ω·mm). In the thermal radiation element 1A of this example, the plasmonic perfect absorber 10A has a thickness of 220 nm in total.

<Thermal Radiation Element Module>

A gold wire having a diameter φ of 25 μm is used as the metal wire 32 that electrically connects the electrode pad 21 and the electrode pad 132 and the metal wire (see the lower view of FIG. 1) that electrically connects the electrode pad 22 and the electrode pad 133.

As the pressure inside the cavity C, 1×100 Pa is employed.

Second Example

The thermal radiation element module M according to a second example of the present invention will be described below. In the present example, the configuration of the thermal radiation element 1B illustrated in FIG. 5 is adopted as the thermal radiation element, and each component is designed as follows. In the thermal radiation element module M of this example, it has been confirmed that, in a case where 700° C. is adopted as one example of the operating temperature of the thermal radiation element 1B, near-infrared light of 1.0 μm or more and 2.0 μm or less is stably emitted. That is, the thermal radiation element module M of this example can be suitably used as a thermal radiation light source that has the operating temperature of 700° C. and stably emits near-infrared light of 1.0 μm or more and 2.0 μm or less.

<Substrate>

As the substrate 14, a plate-shaped member made of quartz glass, having the thickness $t_S$ of 500 μm and the square shape with a side length of 10 mm is used.

<Plasmonic Perfect Absorber>

An HfN film having the thickness $t_{13}$ of 200 nm is used as the conductor layer 13.

As the insulator layer 12, an $SiO_2$ film having the thickness $t_{12}$ of 320 nm is used.

An HfN film having the thickness $t_{11}$ of 40 nm is used as the conductor layer 11. In addition, shapes of the plurality of conductor patterns 111 constituting the conductor layer 11 are the same as the shapes of the plurality of conductor patterns 111 adopted in the first example.

As the pair of base layers 131B, a two-layer film of Cr/Pt is adopted. The thickness of Cr is 100 nm, and the thickness of Pt is 200 nm.

As the electrode pads 132B and 133B, a gold film having a thickness (length in the left-right direction in FIG. 5) of 500 nm is used. On one side surface of the substrate 14 and the plasmonic perfect absorber 10B, one base layer 131B and an electrode pad 132B are laminated in this order on the entire surface, and on a side surface facing the one side surface, the other base layer 131B and the electrode pad 133B are laminated in this order on the entire surface.

The electrical resistivity of HfN adopted in this example is about $1\times10^{-3}$ (Ω·mm), and the electrical resistivity of $SiO_2$ adopted in this example is about $1\times10^{15}$ (Ω·mm). In the thermal radiation element 1B of this example, the plasmonic perfect absorber 10B has a thickness of 580 nm in total.

<Thermal Radiation Element Module>

In this example, sintered silver is used as the bonding member 31 that bonds and conducts the one base layer 131B and a part of the electrode pad 132B (part in the vicinity of a lower end in the state shown in FIG. 5) and the electrode pad 21, and the bonding member 31 that bonds and conducts the other base layer 131B and a part of the electrode pad 133B (part in the vicinity of the lower end in the state shown in FIG. 5) and the electrode pad 22.

As the pressure inside the cavity C, 1×100 Pa is employed.

ADDITIONAL REMARKS

The present invention is not limited to the embodiments stated above, and various modifications can be made within the scope defined in claims, and embodiments obtained by appropriately combining technical means disclosed in different embodiments are also included in the technical scope of the present invention.

What is claimed is:

1. A thermal radiation element comprising:
- a substrate made of an insulator having a pair of main surfaces; and
- a plasmonic perfect absorber in which a first conductor layer covering at least a part of one main surface of the substrate, an insulator layer, and a second conductor layer are laminated in this order, wherein
- the first conductor layer is provided with at least one electrode through which a current flows in an in-plane direction of a main surface of the first conductor layer.

2. The thermal radiation element according to claim 1, wherein
- a thermal conductivity of the insulator constituting the substrate is lower than a thermal conductivity of a conductor constituting the first conductor layer.

3. The thermal radiation element according to claim 1, wherein
- the second conductor layer includes a plurality of conductor patterns arranged two-dimensionally and periodically, each of the plurality of conductor patterns having a circular shape or a regular polygonal shape.

4. The thermal radiation element according to claim 1, wherein
- a thickness t1 of the first conductor layer and a thickness t2 of the second conductor layer satisfy a relationship of t1>1.5× t2.

5. The thermal radiation element according to claim 1, wherein
- the substrate has a thickness of 100 μm or more and 10 mm or less.

6. The thermal radiation element according to claim 1, wherein
- a thickness t1 of the first conductor layer, a thickness td of the insulator layer, and a thickness t2 of the second conductor layer are all 10 nm or more and 10 μm or less.

7. The thermal radiation element according to claim 1, wherein
- a region where the first conductor layer is formed has a rectangular shape,
- the first conductor layer is provided with a pair of the electrodes, and
- each of the pair of the electrodes is provided on each of a pair of opposite sides in a region having the rectangular shape.

8. The thermal radiation element according to claim 1, wherein
- the substrate is made of glass or ceramic.

9. The thermal radiation element according to claim 1, wherein
- the first conductor layer and the second conductor layer are made of HfN.

10. The thermal radiation element according to claim 1, wherein
- the insulator layer is made of at least one of $SiO_2$, $Al_2O_3$, and AlN.

11. A thermal radiation element module comprising:
- the thermal radiation element according to claim 1; and
- a housing provided with a cavity that houses the thermal radiation element and a power terminal that supplies power to the at least one electrode, wherein
- at least a part of the substrate is fixed to the cavity using a bonding member inside the cavity.

12. The thermal radiation element module according to claim 11, wherein
- an opening of the cavity includes the thermal radiation element in plan view of the opening,
- the opening is sealed by an optical window having translucency, and
- a pressure inside the cavity is lower than a pressure outside the cavity.

13. A thermal radiation light source comprising:
- the thermal radiation element module according to claim 11.

* * * * *